US010885120B2

(12) United States Patent
Spencer-Harper et al.

(10) Patent No.: US 10,885,120 B2
(45) Date of Patent: Jan. 5, 2021

(54) SYSTEM AND METHOD FOR QUERYING A DATA REPOSITORY

(71) Applicant: Palantir Technologies Inc., Palo Alto, CA (US)

(72) Inventors: Quentin Spencer-Harper, London (GB); Bianca Rahill-Marier, London (GB); Jack Grossman, Albuquerque, NM (US); Jim Inoue, Kirkland, WA (US); Myles Scolnick, New York, NY (US); Richard Niemi, Seattle, WA (US); Thomas Mcintyre, London (GB)

(73) Assignee: Palantir Technologies Inc., Denver, CO (US)

( * ) Notice: Subject to any disclaimer, the term of this patent is extended or adjusted under 35 U.S.C. 154(b) by 148 days.

(21) Appl. No.: 16/141,135

(22) Filed: Sep. 25, 2018

(65) Prior Publication Data

US 2019/0108291 A1 Apr. 11, 2019

(51) Int. Cl.
*G06F 16/00* (2019.01)
*G06F 16/903* (2019.01)
*G06F 16/904* (2019.01)
*G06F 16/2455* (2019.01)
*G06F 16/958* (2019.01)
*G06F 16/9038* (2019.01)
*G06F 16/335* (2019.01)
*G06F 16/901* (2019.01)
(Continued)

(52) U.S. Cl.
CPC ...... *G06F 16/90335* (2019.01); *G06F 16/248* (2019.01); *G06F 16/2456* (2019.01); *G06F 16/24544* (2019.01); *G06F 16/335* (2019.01);
*G06F 16/904* (2019.01); *G06F 16/9024* (2019.01); *G06F 16/9038* (2019.01); *G06F 16/958* (2019.01)

(58) Field of Classification Search
None
See application file for complete search history.

(56) References Cited

U.S. PATENT DOCUMENTS

| 6,640,231 B1 * | 10/2003 | Andersen ............... G06F 16/30 |
| 2008/0033993 A1 * | 2/2008 | Uceda-Sosa .......... G06F 16/242 |
| 2008/0162498 A1 | 7/2008 | Omoigui |

(Continued)

OTHER PUBLICATIONS

B. Petersen et al., "Knowledge Bus: Generating Application-focused Databases from Large Ontologies", Proceedings of the 5th KRDB Workshop, May 1998, pp. 1-10.*

(Continued)

*Primary Examiner* — Bai D Vu
(74) *Attorney, Agent, or Firm* — Sheppard Mullin Richter & Hampton LLP

(57) ABSTRACT

A search request relating to one or more datasets in the data repository can be received, the search request comprising a display request to display at least a portion of the one or more datasets. In response to the search request, a searchable database can be generated from the one or more datasets in a data repository based on ontological data associated with the one or more datasets. An object view of at least the portion of one or more datasets can be generated from the searchable database, the view being generated based on the ontological data. The generated object view can be provided to be displayed on a display device.

20 Claims, 9 Drawing Sheets

(51) Int. Cl.
*G06F 16/2453* (2019.01)
*G06F 16/248* (2019.01)

(56) References Cited

U.S. PATENT DOCUMENTS

| | | | |
|---|---|---|---|
| 2009/0030897 A1* | 1/2009 | Hatami-Hanza | G06F 16/31 |
| 2012/0310963 A1* | 12/2012 | Seo | G06F 16/24566 707/758 |
| 2014/0258304 A1* | 9/2014 | Sabanski | G06F 16/904 707/740 |
| 2016/0246820 A1 | 8/2016 | Depaoli et al. | |
| 2017/0115865 A1 | 4/2017 | Goldenberg et al. | |

OTHER PUBLICATIONS

Official Communication for European Patent Application No. 18196628.4 dated Nov. 13, 2018.
Anick et al. "Versioning a Full-text Information Retrieval System", ACM, 2 Penn Plaza, Suite 701—New York USA, Jun. 1992 (Jun. 1992), pp. 98-111.

\* cited by examiner

SYSTEM AND METHOD FOR QUERYING A DATA REPOSITORY

CROSS REFERENCE TO RELATED APPLICATIONS

This application claims the benefit of United Kingdom Application Number 1716303.1, filed Oct. 5, 2017, the content of which is incorporated by reference in its entirety into the present disclosure.

FIELD

The present disclosure relates to methods and systems for querying data in a data repository. More particularly, this disclosure relates to methods and systems of generating object views in response to a database query.

BACKGROUND

Many large-scale data analytic systems use a large number of different datasets during their operation. These datasets may be related to one another in a structured way. Storing the relational data within the datasets themselves can result in a large increase in the size of the datasets, with a corresponding reduction in the performance of the analytic systems that operate on them. Furthermore, large data repositories containing multiple datasets can be difficult for a user to interact with.

SUMMARY

One embodiment of the present disclosure provides a method, performed by one or more processors, of querying data in a data repository comprising receiving a search request relating to one or more datasets in the data repository, the search request comprising a display request to display at least a portion of the one or more datasets; in response to the search request, generating a searchable database from the one or more datasets in a data repository based on ontological data associated with the one or more datasets; generating, from the searchable database, an object view of at least the portion of one or more datasets, the view being generated based on the ontological data; and providing the generated object view to be displayed on a display device.

In some embodiments, the one or more datasets comprises a plurality of datasets and wherein the ontological data comprises an indication of one or more joins between the datasets in the plurality of datasets.

In some embodiments, one or more of the datasets comprises one or more objects and wherein the ontological data comprises display data relating to the one or more objects.

In some embodiments, the ontological data comprises a display prominence for one or more of the objects.

In some embodiments, the search request comprises one or more filters.

In some embodiments, the view comprises one or more lists, the lists comprising tabs linking displayed data to joined datasets.

In some embodiments, the method further comprises editing, through a user interface, the object view to create an edited object view.

In some embodiments, the method further comprises: determining one or more differences between the edited object view and the object view generated in dependence on the ontological data; associating the one or more differences with a user; and storing the one or more differences in a memory.

In some embodiments, generating the object view comprises retrieving one or more stored object view differences associated with the user; determining whether the one or more stored object view differences is compatible with the ontological data associated with the one or more datasets; and in response to a positive determination, applying the one or more object view differences to a default object view generated in dependence on the ontological data, thereby to generate the object view. In some embodiments, generating the object view further comprises in response to a negative determination, generating the default object view for display. In some embodiments, the one or more stored object view differences comprises a hierarchy of stored object view differences.

In some embodiments, the ontological data is at least in part generated by the one or more processors based on properties of the one or more datasets.

In some embodiments, the method further comprises editing one or more of the datasets; updating the ontological data in dependence on the one or more edited datasets; and regenerating the object view in dependence on the updated ontology.

In some embodiments, the method further comprises editing the ontological data; and regenerating the object view in dependence on the edited ontological data.

Another embodiment of the disclosure provides a system comprising: a user interface; a data aggregation module; a data repository comprising a plurality of datasets; and an ontology layer comprising metadata indicative of relationships between the plurality of datasets; one or more physical processors; a memory storing instructions that, when executed by the one or more physical processors, cause the system to: receiving a search request relating to one or more datasets in the data repository, the search request comprising a display request to display at least a portion of the one or more datasets; in response to the search request, generating a searchable database from the one or more datasets in a data repository based on ontological data associated with the one or more datasets; generating, from the searchable database, an object view of at least the portion of one or more datasets, the view being generated based on the ontological data; and providing the generated object view to be displayed on a display device.

In some embodiments, the one or more datasets comprises a plurality of datasets and wherein the ontological data comprises an indication of one or more joins between the datasets in the plurality of datasets.

In some embodiments, one or more of the datasets comprises one or more objects and wherein the ontological data comprises display data relating to the one or more objects.

Yet another embodiment provides a non-transitory computer-readable storage medium including instructions that, when executed by at least one processor of a computing system, cause the computing system to perform a method comprising: receiving a search request relating to one or more datasets in the data repository, the search request comprising a display request to display at least a portion of the one or more datasets; in response to the search request, generating a searchable database from the one or more datasets in a data repository based on ontological data associated with the one or more datasets; generating, from the searchable database, an object view of at least the portion of one or more datasets, the view being generated based on the ontological data; and providing the generated object view to be displayed on a display device.

In some embodiments, the one or more datasets comprises a plurality of datasets and wherein the ontological data comprises an indication of one or more joins between the datasets in the plurality of datasets.

In some embodiments, one or more of the datasets comprises one or more objects and wherein the ontological data comprises display data relating to the one or more objects.

DETAILED DESCRIPTION

Reference will now be made in detail to implementations, examples of which are illustrated in the accompanying drawings.

Figure 1:
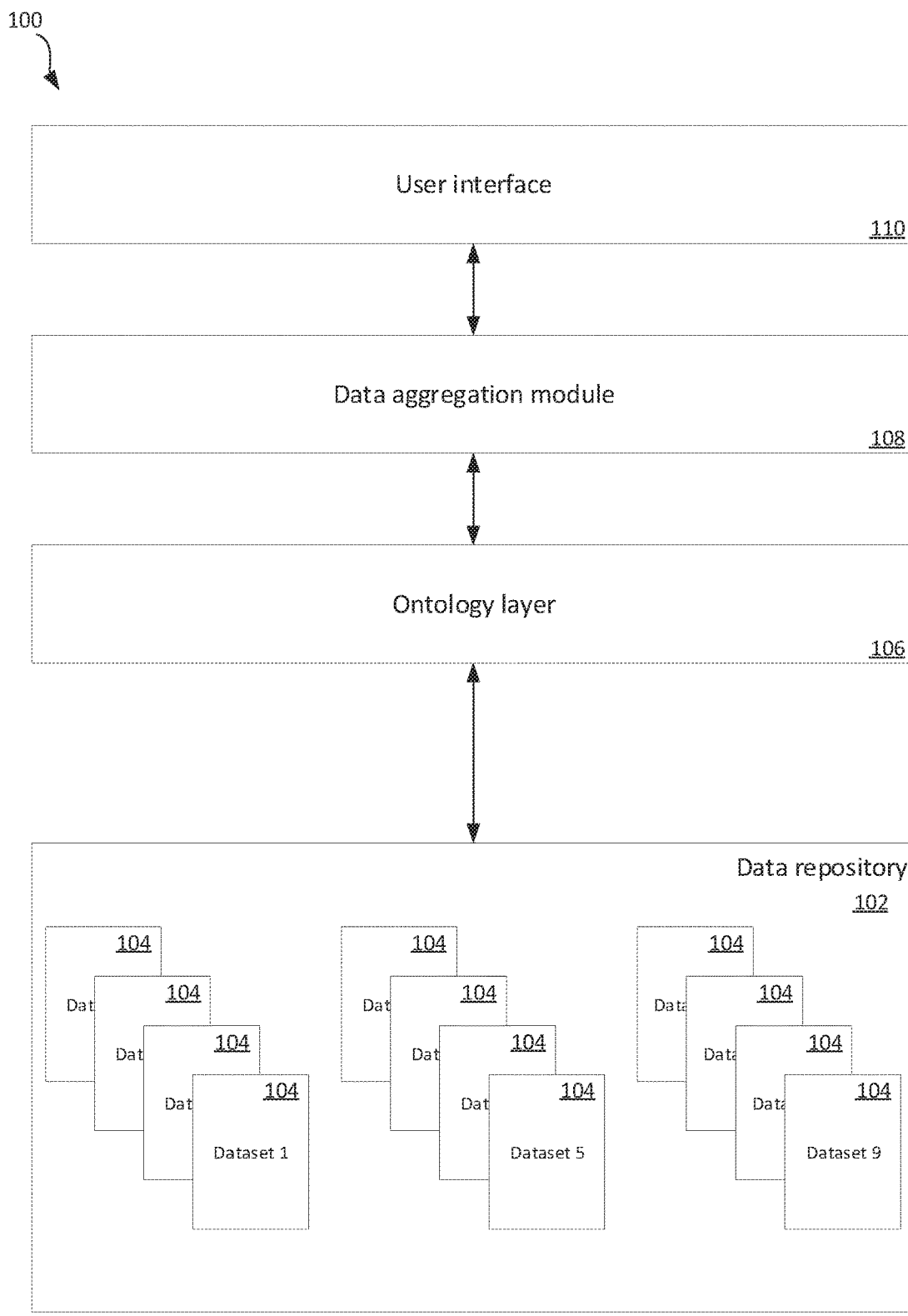
FIG. 1 shows a schematic example of a data aggregation and processing system.

FIG. 1 shows a schematic example of a data aggregation and processing system.

The system 100 comprises a data repository 102 comprising one or more of datasets 104. The each of the one or more datasets comprises data representing objects. The data repository may contain a plurality of datasets. The datasets may be in a table format, the tables comprising one or more rows and one or more columns of objects. The datasets may comprise relational databases.

The data repository 102 may be a distributed data repository, with the datasets 104 comprising the data repository 102 being stored at a plurality of locations. One or more of the datasets 104 may be under control of one or more different entities. The datasets 104 may be edited by the entities that control them, for example to update the data in the dataset in light of new measurements and/or surveys.

An object may refer to a thing/a grouping of things with a given set of properties. An object may reference tangible/intangible things and/or animate/inanimate things. As non-limiting examples, an object may refer to persons, vehicles, portions of a vehicle, buildings, portions of buildings, investigations, portions of an investigation, schedules, or rights/demands for rights, and/or other things. Other types of objects are contemplated.

A definition of an object may describe the object by specifying/identifying one or more properties (e.g. characteristics) of the object. For example, an object may include a person and a definition of the object may describe the person by specifying/identifying particular properties (e.g. gender, height, weight, education, occupation, address, phone number) of the person. The values of the properties may be stored in one or more columns and/or rows of a database as strings, numbers and/or other forms of expression. The definition of the object may identify the particular columns and/or rows of the database storing the relevant values of the properties of the object. In some embodiments, a given property of an object may be derived from one or more values of datasets. For example, a given property of an object may be determined based on multiple values within one or more tables.

An object may be related to one or more other objects. Relationships among objects may be between objects of the same type (e.g. relationships between people objects, such as between family members, co-workers, persons who have interacted with each other) and/or between objects of different types (e.g. relationships between a person object and a non-person object, such as between a person and a schedule, a person and an investigation). For example, objects representing individual investigations (e.g. of accidents, of claims, of demand for rights) may be related to an object representing a group of investigations (e.g. based on commonalities, based on a user input). Such relationships may effectuate grouping individual investigations into groups of investigations. As another example, objects representing individual investigations may be related to an object representing persons (e.g. persons associated with investigations). Relationships between objects may include one-to-one relationships, one-to-many relationships, many-to-one relationships, many-to-many relationships, and/or other relationships.

The system 100 further comprises an ontology layer 106. The ontology layer 106 provides an ontology for interpreting objects in the data repository. Data defined in the ontology is herein described as "ontological data".

An ontology may define aspects of objects, such as how properties of an object may be presented and/or modified. For example, an ontology may include a person object type including a name property, and the ontology may define how the name may be presented (e.g. first name followed by last name; last name followed by first name; first name followed by initial). The ontology may define a display prominence of an object. For example, the object may be assigned a "Prominent", "Normal" or "Hidden" display prominence. Prominent objects can be rendered before normal properties when displaying a portion of the properties. Normal objects may be assigned no special prominence in the display order. Hidden objects may not be displayed.

The ontology may define how/whether the name may be modified (e.g. based on user input, based on user account privileges). As another example, a definition of a person may include one or more relationship properties and the ontology may define how/whether the relationships may be presented and/or modified. In some embodiments, an ontology may define whether/how properties of an object may be created and/or removed. For example, an ontology may define whether a user may add or remove one or more properties of the person object type. The definitions/ontologies may be created based on user input. The definitions/ontologies may be modified (e.g. based on user input, based on system changes).

The ontology may define how one or more of the datasets 104 in the data repository 102 are related. For example, the ontology may define joins between datasets 104 in the data repository 102. Joins may comprise links between the data to allow for multiple datasets to be navigated and/or searched as if they were a single dataset.

Ontologies may be defined via a user interface 110 and stored in the ontology layer 106.

Ontologies may be defined automatically by the ontology layer 106. Ontological data may be prepopulated based on properties of the one or more datasets 104 in the data repository 102. For example, the ontology layer 106 may scan across one or more of the datasets 104 to determine/predict any relationships between objects in the dataset and/or a display prominence for one or more objects in the datasets 104. For example, the fraction of column/row values in a column/row that contain a unique value can be used as an indication of the importance of that column/row. The importance of the column/row can be used to determine a display prominence for objects in that column/row. In a further example, the cardinalities of a column/row can be used to determine the possible display mode for displaying data in that column/row (e.g. which graph types the data can be displayed as).

The system 100 further comprises a data aggregation module 108. The data aggregation module 108 generates searchable databases from the plurality of datasets 104 in response to a user search request using the ontology in the ontology layer 106.

The data aggregation module 108 may take a dataset mentioned in ontology, synchronise the dataset into a searchable database and automatically resynchronise the database with the underlying dataset and ontology while remaining available to be queried.

The system additionally comprises a user interface 110, for example in the form of a graphical user interface. The user interface allows a user to interact with the system, for example to interact with objects stored in the datasets stored in the data repository or to edit the ontology. As an example of a user interaction, the user may input a search request into the system via the user interface. The search request may be input in a functional language, which may be converted to a database query for querying the one or more datasets 104 in the data repository 102. For example, a high-level functional search request may be converted into a Query Domain Specific Language (DSL) based on JavaScript Object Notation (JSON). This can reduce the effort needed for a developer to interact with the datasets 104.

A search request may return one or more objects that match one or more searching criteria. Criteria for a search request may include one or more parameters relating to properties of objects, reference identifiers of objects, and/or other criteria. In some embodiments, a reference identifier for an object may include one or more of a service, instance, type and/or locator. One or more filters may be supplied with the search request. In some embodiments, a search request may support a keyword filter (e.g., searching one or more fields of objects for a specified query string/value), an object type filter (e.g. limiting the search results to a specific set of object types), a property filter (e.g. specifying a query string/value to match on to one or more specific properties for a specific object/object type and/or one or more global properties that multiple objects/object types may share). A search result may require matching on some or all of the specified criteria.

Objects returned by the search request may be viewed through the user interface. A list of objects meeting the search criteria can be displayed on the user interface. The user may select one or more the objects to view and/or interact with.

When an object is selected to be viewed, a dashboard is auto-generated using the ontology. The dashboard allows the user to interact with the object view in the ways defined in the ontology. The object view may comprise links to other objects, as defined in the ontology. The links may be one-to-one, one-to-many or many-to-one. Where one-to-many links are indicated by the ontology, the object view may include one or more tabs allowing the user to select which of the links to navigate to view a linked object.

Furthermore, in some examples, the ontology may define a plurality of object views for an object and/or link. The object view may then comprise a view tab through which the user can select which of the views of the object to display. The initial/default view of the object displayed to the user may be defined in the ontology.

Once displayed, the user may interact with an object through the user interface 110. The user can, for example, customise the object view. Examples of customisation of an object view include adding tabs and/or widgets to the object view and/or changing an object view type. The user may, in some embodiments, edit the object itself. Edits to the object may be written back to the underlying dataset. In some embodiments, the object edits may be written to a cache of the data aggregation module during operation of the system by a user. The object edits will be written from the data aggregation module cache to the underlying dataset upon a request from the user. In some embodiments, the user may require a permission to write the object edits back to the underlying dataset.

The system can be used by multiple users at once, each interacting with the system through a user interface on a different device. Where multiple users attempt to edit a dataset at the same time, vector clocks and resolution strategies can be used to resolve the conflicts.

The database aggregation module 108 can maintain an up-to-date version of the searchable databases it has generated. The searchable databases can be resynchronised when updates to the underlying datasets and/or the ontology are detected. Only the updated parts may be resynchronised, not the full database.

Figure 2:
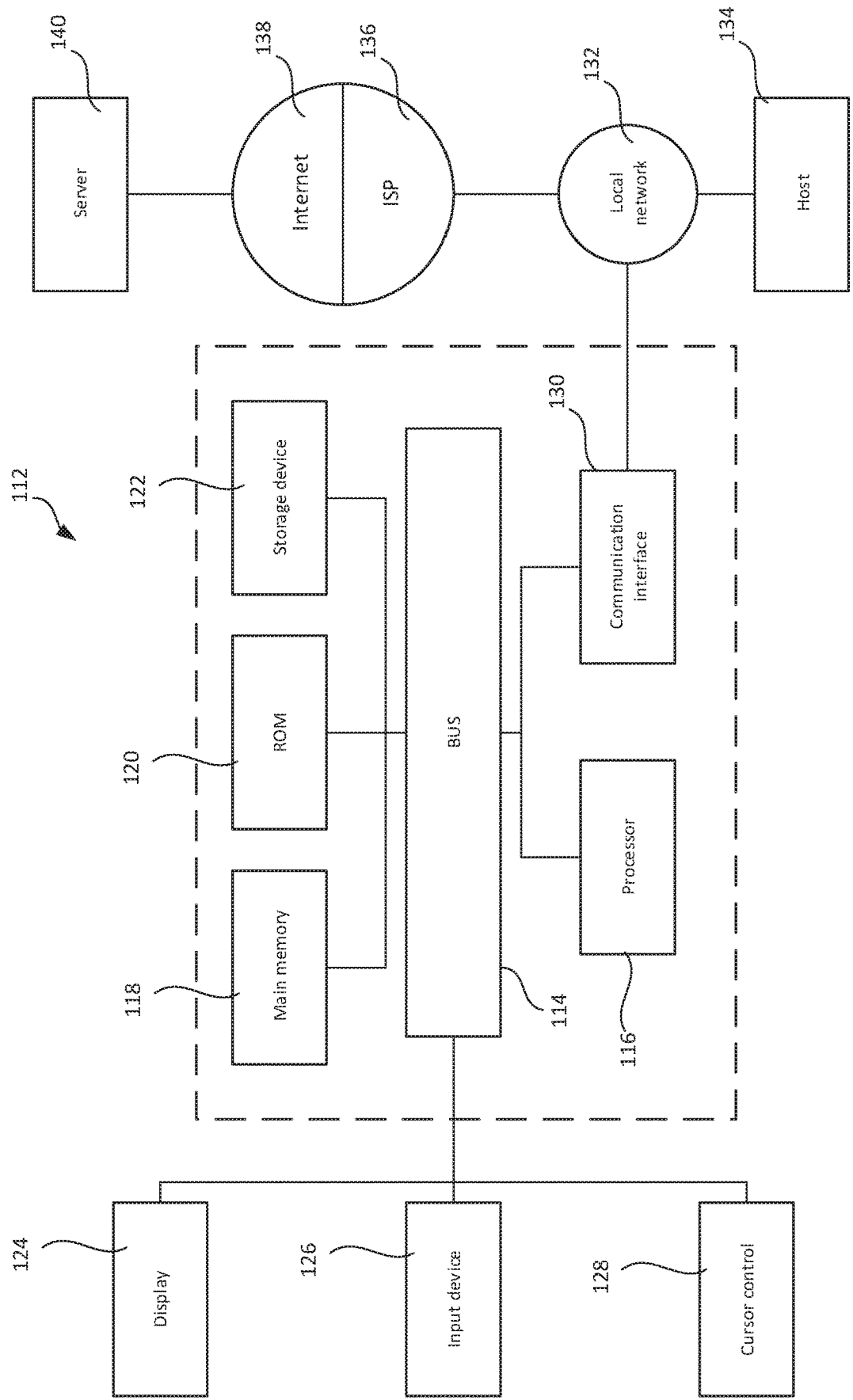
FIG. 2 shows a block diagram of an exemplary computer system.

Referring to FIG. 2, a block diagram of an exemplary computer system, which may comprise the data repository, the client device, the data aggregation module and/or the ontology layer, consistent with examples of the present specification is shown.

Computer system 112 includes a bus 114 or other communication mechanism for communicating information, and a hardware processor 116 coupled with bus for processing information. Hardware processor 116 can be, for example, a general purpose microprocessor. Hardware processor 116 comprises electrical circuitry.

Computer system 112 includes a main memory 118, such as a random access memory (RAM) or other dynamic storage device, which is coupled to the bus for storing information and instructions to be executed by processor. The main memory 118 can also be used for storing temporary variables or other intermediate information during execution of instructions by the processor 116. Such instructions, when stored in non-transitory storage media accessible to the processor, render the computer system 112 into a special-purpose machine that is customized to perform the operations specified in the instructions. The main memory 118 may be referred to as volatile memory.

Computer system 112 further includes a read only memory (ROM) 120 or other static storage device 122 coupled to the bus for storing static information and instructions for the processor1. A storage device 122, such as a magnetic disk or optical disk, is provided and coupled to the bus for storing information and instructions.

Computer system 112 can be coupled via the bus to a display 124, such as a cathode ray tube (CRT), liquid crystal display, or touch screen, for displaying information to a user.

An input device 126, including alphanumeric and other keys, is coupled to the bus 114 for communicating information and command selections to the processor 116. Another type of user input device 126 is cursor control 128, for example using a mouse, a trackball, or cursor direction keys for communicating direction information and command selections to the processor and for controlling cursor movement on the display. The input device 126 typically has two degrees of freedom in two axes, a first axis (for example, x) and a second axis (for example, y), that allows the device to specify positions in a plane.

Computer system 112 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 118. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 130 coupled to the bus 114. The communication interface provides a two-way data communication coupling to a network link that is connected to a local network 132. For example, the communication interface can be an integrated services digital network (ISDN) card, cable modem, satellite modem, or a modem to provide a data communication connection to a corresponding type of telephone line. As another example, the communication interface 1330 can be a local area network (LAN) card to provide a data communication connection to a compatible LAN. Wireless links can also be implemented. In any such implementation, the communication interface 130 sends and receives electrical, electromagnetic or optical signals that carry digital data streams representing various types of information.

The network link typically provides data communication through one or more networks to other data devices. For example, the network link can provide a connection through the local network 132 to a host computer 134 or to data equipment operated by an Internet Service Provider (ISP) 136. The ISP 136 in turn provides data communication services through the world wide packet data communication network now commonly referred to as the "Internet" 8. The local network 132 and internet 138 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 140.

Figure 3:
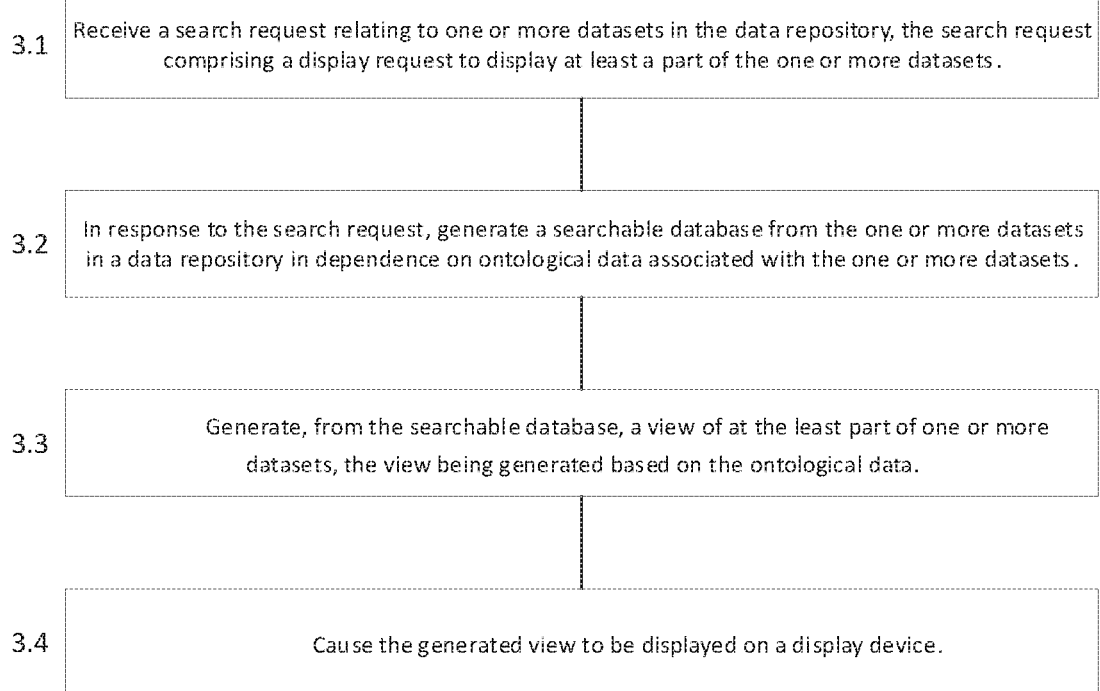
FIG. 3 shows an example of a method of using a data aggregation and processing system.

FIG. 3 shows an example of a method of using a data aggregation and processing system.

A search request is input into a user interface by a user via a user device (operation 3.1).

The search request relates to one or more datasets 104 in the data repository 102. The search request can comprise a request to display one or more objects in the datasets 104. The user device comprises a display for display of results if the user search request, and is herein also referred to as a display device.

The search request can be input through a graphical user interface using high-level commands. The high level commands are converted by the system into database queries for querying the one or more datasets 104 in the data repository 102. In some examples, the high level commands can be input using a functional language. In some embodiments, the high level commands are input through selecting options in a graphical user interface.

At operation 3.2, in response to the search request, the data aggregation module accesses the data repository to retrieve the objects related to the search request. The data aggregation module generates a searchable database from the retrieved objects using the ontology in the ontology layer. Ontological data is associated with objects in one or more datasets, and can comprise, for example, joins between datasets relating to similar and/or related objects.

From the searchable database, a view of one or more of the objects can be generated (operation 3.3). The object view is generated based on the ontology in the ontology layer. For example, the ontology layer can define that an object should be presented as a bar chart, a line graph, a histogram, a table, a list or any other type of view. The ontology can also define the prominence of the objects, which can determine the order in which a plurality of objects will be displayed and/or if the object can be displayed at all to a user. The generated object view may be in the form of a dashboard.

The generated object can be displayed to a user via the user interface on the display device at operation 3.4.

In effect, the system can provide a user interface that allows a user to interact with multiple datasets in a data repository through a single user interface. Views of objects in the datasets are automatically generated based on the ontology metadata, for example to determine the visual prominence that should initially be assigned to datasets.

Figure 4:
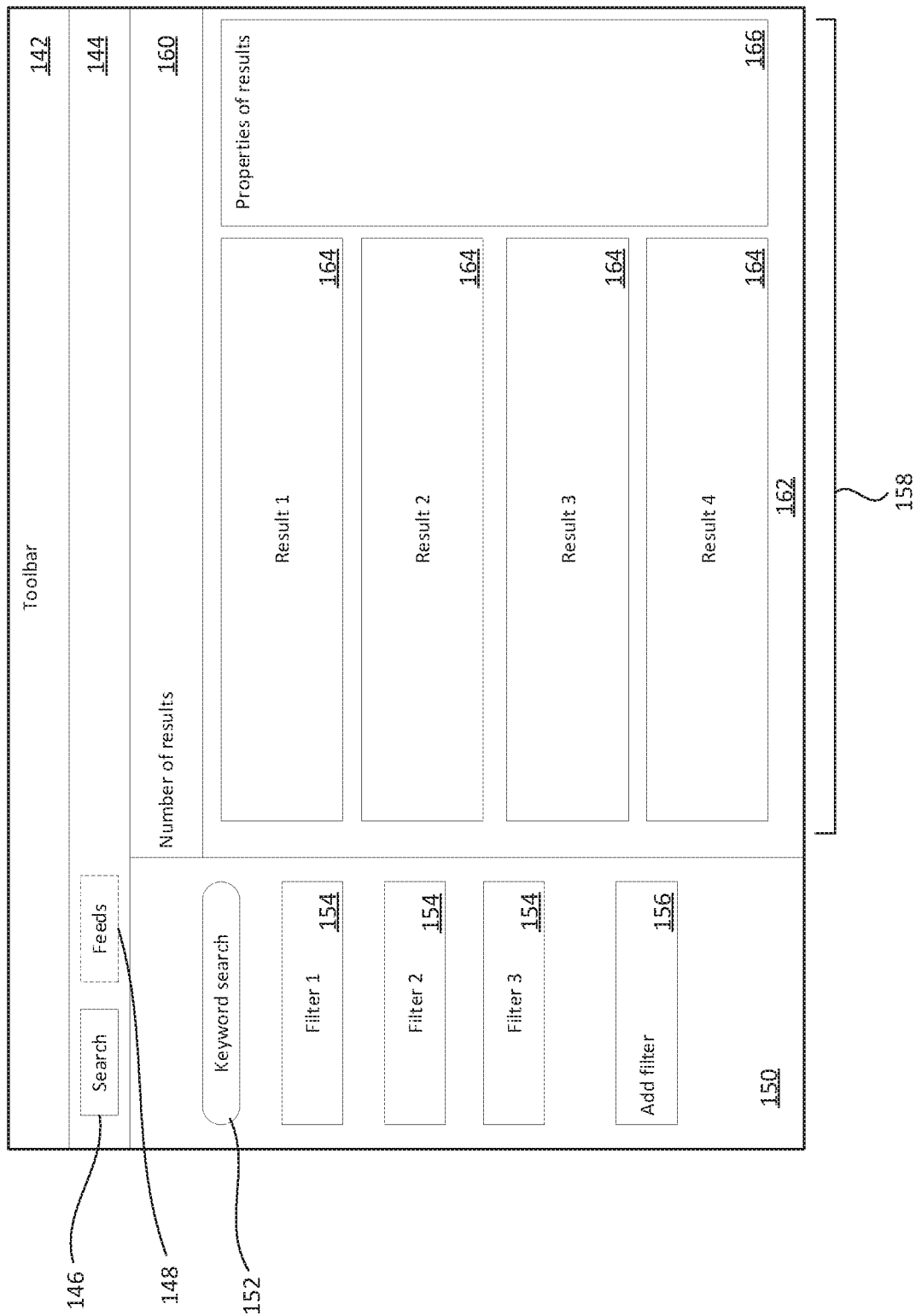
FIG. 4 shows an example of a user interface for a data aggregation and processing system.
Figure 5:
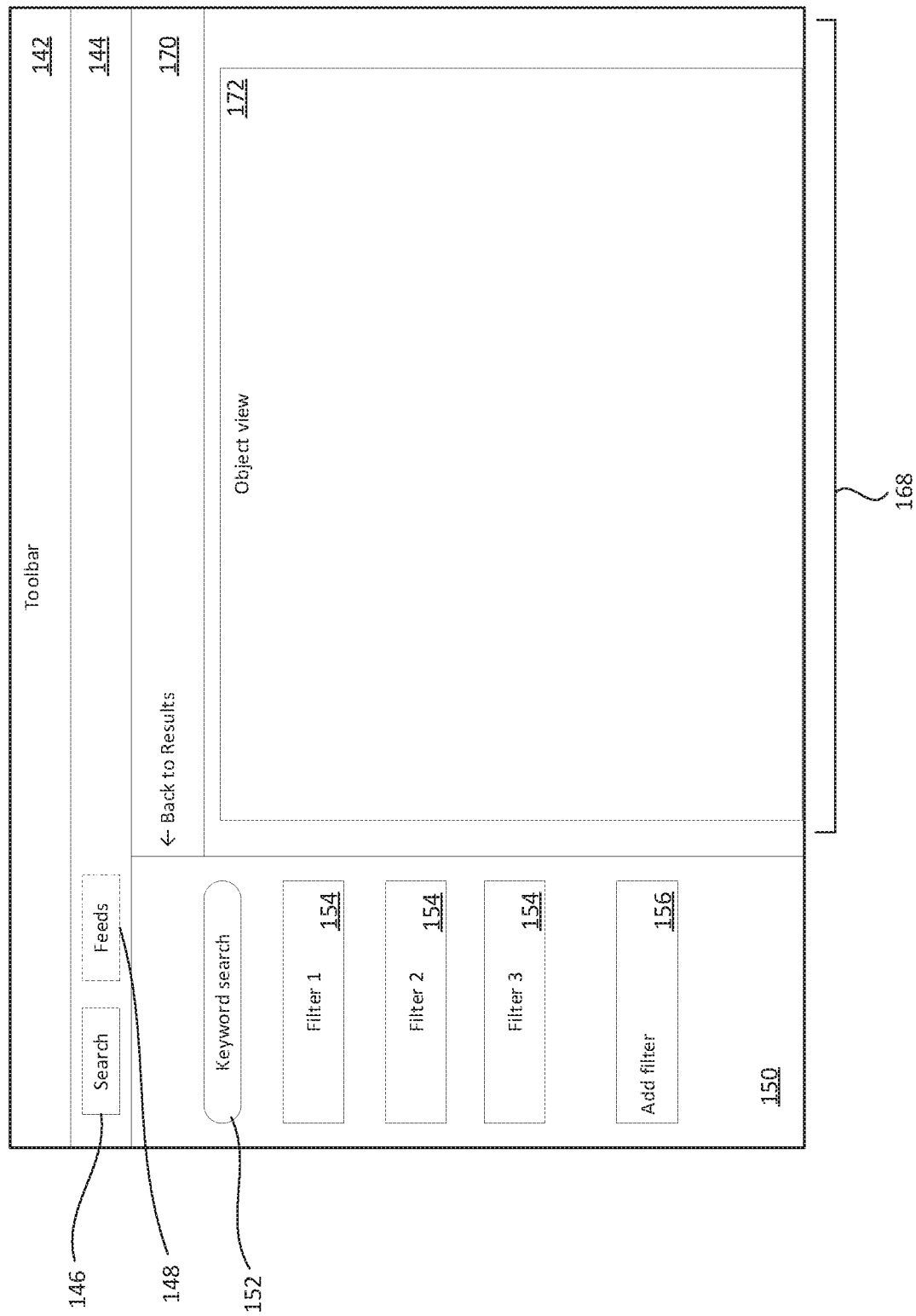
FIG. 5 shows a further example of a user interface for a data aggregation and processing system.
Figure 6:
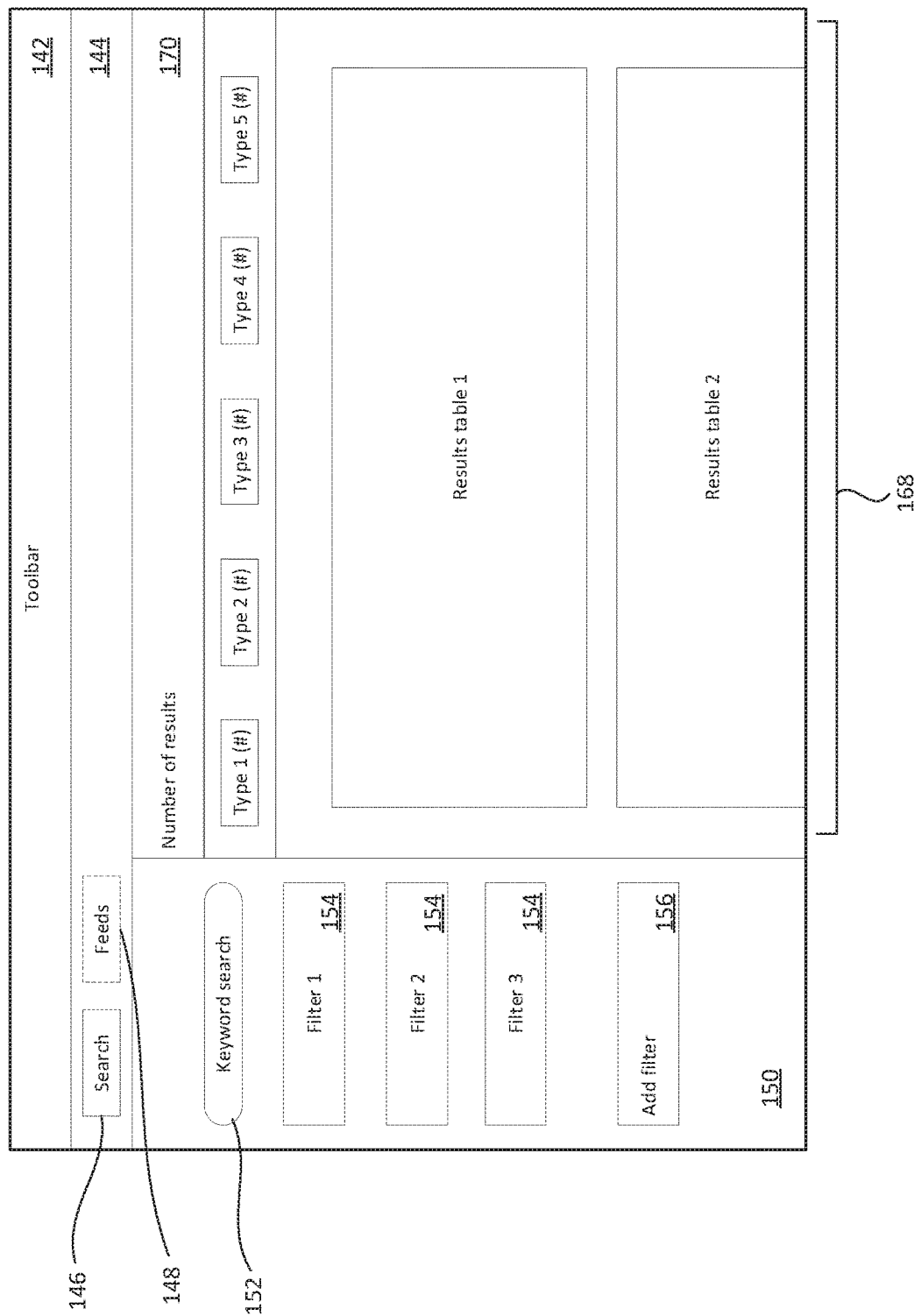
FIG. 6 shows another example of a user interface for a data aggregation and processing system.

FIGS. 4-6 shows examples of a graphical user interface for inputting search requests for querying a data repository and viewing the results of such search queries.

The interface comprises a toolbar 142. The toolbar 142 provides a control element displaying icons and/or menus relating to the user interface. For example, the toolbar 142 may provide file access features, save options and user settings.

The interface further comprises a home bar 144. The home bar 144 comprises two tabs, a search tab 146 and a feeds tab 148. Feeds comprise saved searches that periodically/continuously refresh. Feeds may, in some embodiments, provide alerts to a user that the datasets they are monitoring have been updated.

The interface further comprises a search panel 150. The search panel 150 comprises a keyword search module 152 through which the user may input search requests. One or more filters 154 can be added to the search request, for example by selecting filters from a tab 156. The ontology can be used to provide a predicted set of filters that may be relevant to the datasets that relate to the keyword input into the keyword search module 152. Multiple filters can be added to a search request. As the user is adding a filter, the user can also be provided with a distribution of the options they can chose from. The user can add filters on the search panel 150 to narrow the results. Filters stack in the left column in a human readable way.

The interface further comprises a results panel 158. The results panel comprises a results indicator 160, which indicates the number of results that have been returned for the user search request. The results panel further comprises a results view 162 displaying a list of the objects 164 returned by the system in response to the search request. In some embodiments, the results panel may further comprise a properties panel 166 which displays aggregated statistics relating to the search results. For example, the properties panel may display the number of search results of each object type. The statistics may be displayed in a graphical format, for example a histogram or a pie chart.

The user can explore an object by interacting with it in the results list. For example, clicking on an object in the results list takes the user to that object. The object will then be displayed in dependence on the ontology associated with the object. The graphical user interface will transition to an object view.

A schematic example of an object view in the user interface is shown in FIG. 5. In the user interface, the results panel is replaced by an object view panel 168. The object view panel 168 comprises a return panel 170. The return panel 170 allows a user to navigate back to the results list in the results panel 158 of FIG. 4. The object view panel 168 further comprises an object view 172. The object is displayed in the object view 172 dependence on the ontological data associated with the object in the ontology layer.

The user can interact with the object through the object view 172. Permitted user interactions are defined in the ontological data associated with the object. For example, the object may comprise links to other objects in the same or different datasets that can be navigated by the user. The user may interact with the link to transition the object view 172 to the linked object. The linked object will be retrieved from the data repository. The object view 172 of the linked object will then be generated based on the ontological data in the ontology layer. The linked object will then be displayed in the object view 172. When a linked object is displayed in this way, the return panel 170 will be replaced with a link back to the previous object.

In some embodiments, the search results can be grouped into lists of objects of the same type, as shown in FIG. 6.

Figure 7:
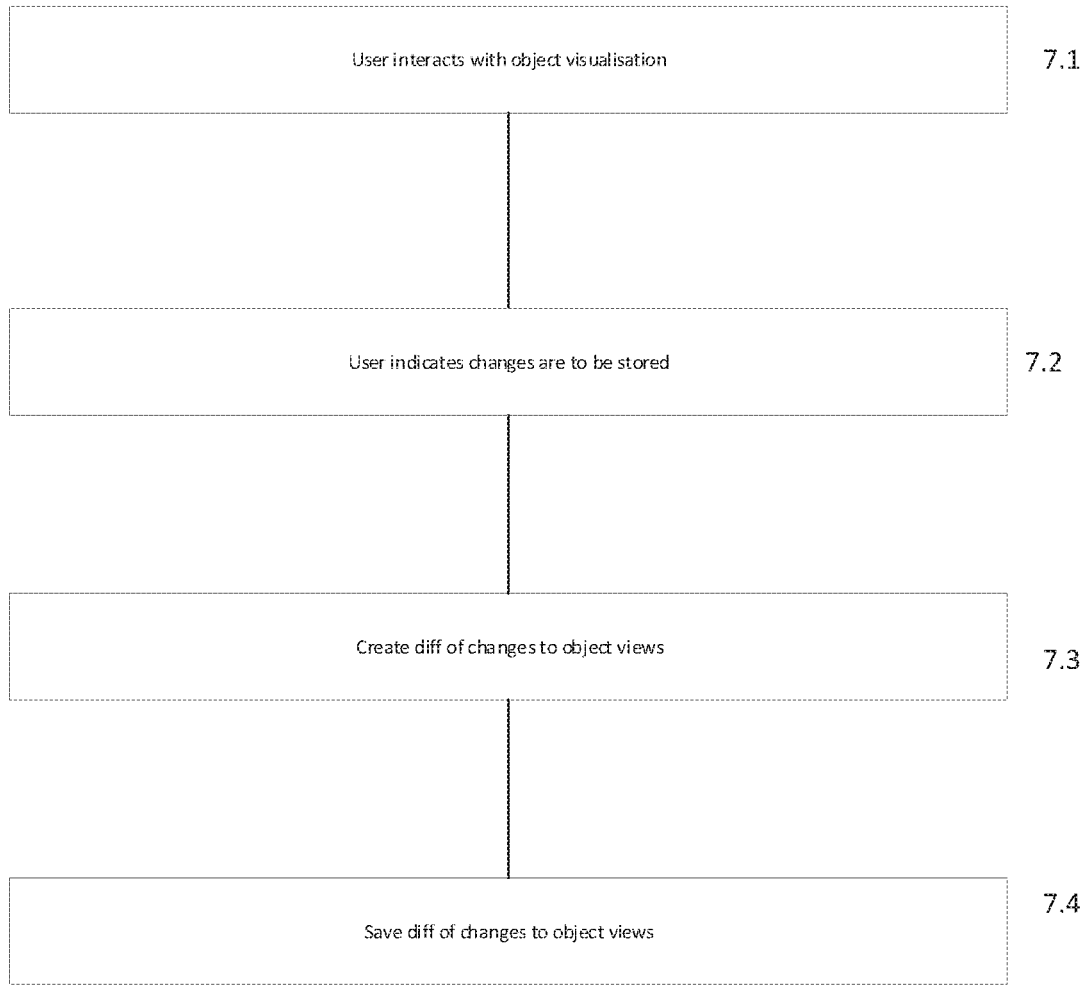
FIG. 7 shows an example of a flow diagram of a method for determining user customisations.

FIG. 7 shows a flowchart of a method for customising a user interface.

Objects displayed on the user interface are initially provided in a view defined by the ontology in the ontology layer of the system. The user can interact with the view via the user interface in order to customise the view. For example, the ontology may define the object view to be displayed as a line graph and/or with a high prominence, while the user may wish to view the object as a list and/or with a low prominence. However, the underlying object and its ontology may be modified between the user customising the view and subsequent reloads of the user customised object view. For example, additional data may be added to the object, which may make a particular view of the object no longer suitable. The ontology will therefore be updated to redefine the default object view. The following method can allow user customisations of an object view to be maintained when the underlying object or ontology are updated.

The default visualisation of an object is initially provided to the user. The user can interact with the object, for example to customise the object view in the user interface (operation 7.1). Customisation of the object may be performed through a graphical user interface, such as the graphical user interface described in relation to FIGS. 4-6 for example. Changes to the visualisation can be temporarily stored in a volatile memory of a user device on which the user interface is displayed.

The user may wish for their customisations to be applied to the object view in future sessions in which the user interacts with the customised objects. The user can indicate that the customisations are to be saved for use in a future session at operation 7.2. This indication can be made through the user interface, for example by selecting a "Save changes" option in a GUI. In some embodiments, the indication is automatically made whenever the user leaves a session.

In response to the indication to save the customisations, the differences between the customised object view and the default view defined in the ontology (herein also referred to as a "diff") are determined (operation 7.3).

The diff can be associated with one or more users, including, for example, the user who implemented the customisations and the objects to which the customisations relate. The diff is stored for future use at operation 7.4. The diff can be stored in the non-volatile memory of the user device used by the user to interact with the object. Alternatively or additionally, the diff may be stored remotely. Remotely stored diffs can be transmitted to a user device when an associated user views one or more of the objects to which the diff relates.

Figure 8:
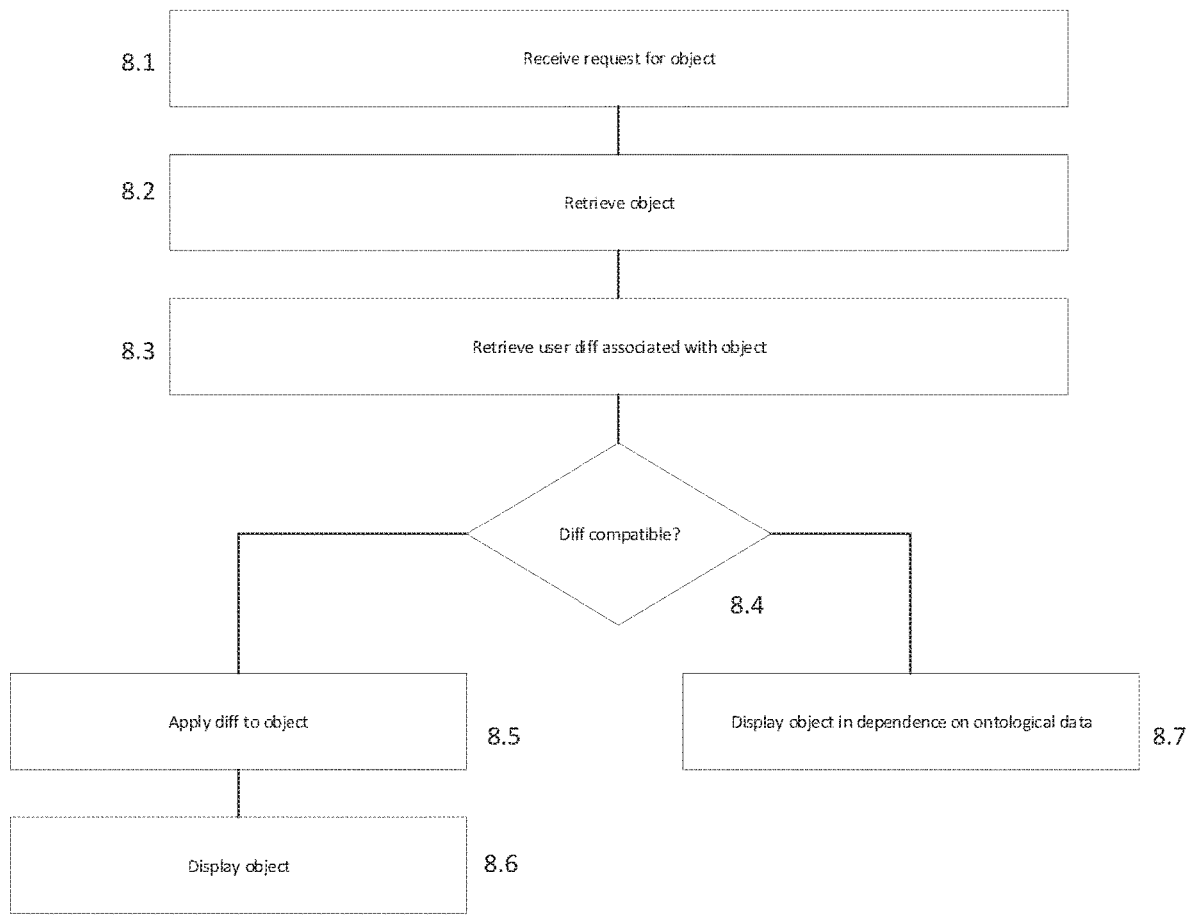
FIG. 8 shows an example of a flow diagram of a method for applying user customisations.

FIG. 8 shows a flow chart of an example of a method for applying customisations to object views.

At operation 8.1 a user request for an object is received by the system through the user interface. The request can be submitted through a graphical user interface, such as that described in relation to FIGS. 4-6 for example.

In response to the request, the system retrieves the object from the relevant dataset in the data repository (operation 8.2). The default object view is defined by the ontology in the ontology layer. The object will be displayed using this default view unless a diff is determined to be present.

At operation 8.3, the system determines if a diff for the object that is associated with the user is present. If a diff is determined to be present, the diff is retrieved from its storage location. The storage location can, for example, be a memory of a user device through which the requesting user is interacting with the user interface of the system. In a further example, the diff may be stored remotely, and transmitted to the user device.

At operation 8.4, it is determined if the diff is compatible with the retrieved object. Ontological data can be used to determine if updates to object properties and/or to the ontology relating to the object have been made. These updates may or may not be compatible with the object view customisations stored in the diff.

If the diff is determined to be compatible with the object, then the diff is applied to the object at operation 8.5. The customised object view as defined by the ontology plus the diff is then displayed to the user via the user interface at operation 8.6.

If the diff is determined to be incompatible with the updated object properties, then the object view as defined in the ontology is used to display the object through the user interface.

In effect, when the ontology is updated the customisation of user applications comprising one or more object views can be automatically reapplied by adding the diff.

In some embodiments, user customisations may be applied in a hierarchical manner. For example, an organisation may generate a hierarchy of diffs to apply to an object. The hierarchy may, for example be an organisational diff, followed by one or more team and/or sub-team diffs, followed by an individual user diff. Changes to diffs higher in the hierarchy can propagate down the hierarchy to ensure that object views remain consistent throughout parts of the organisation.

Figure 9:
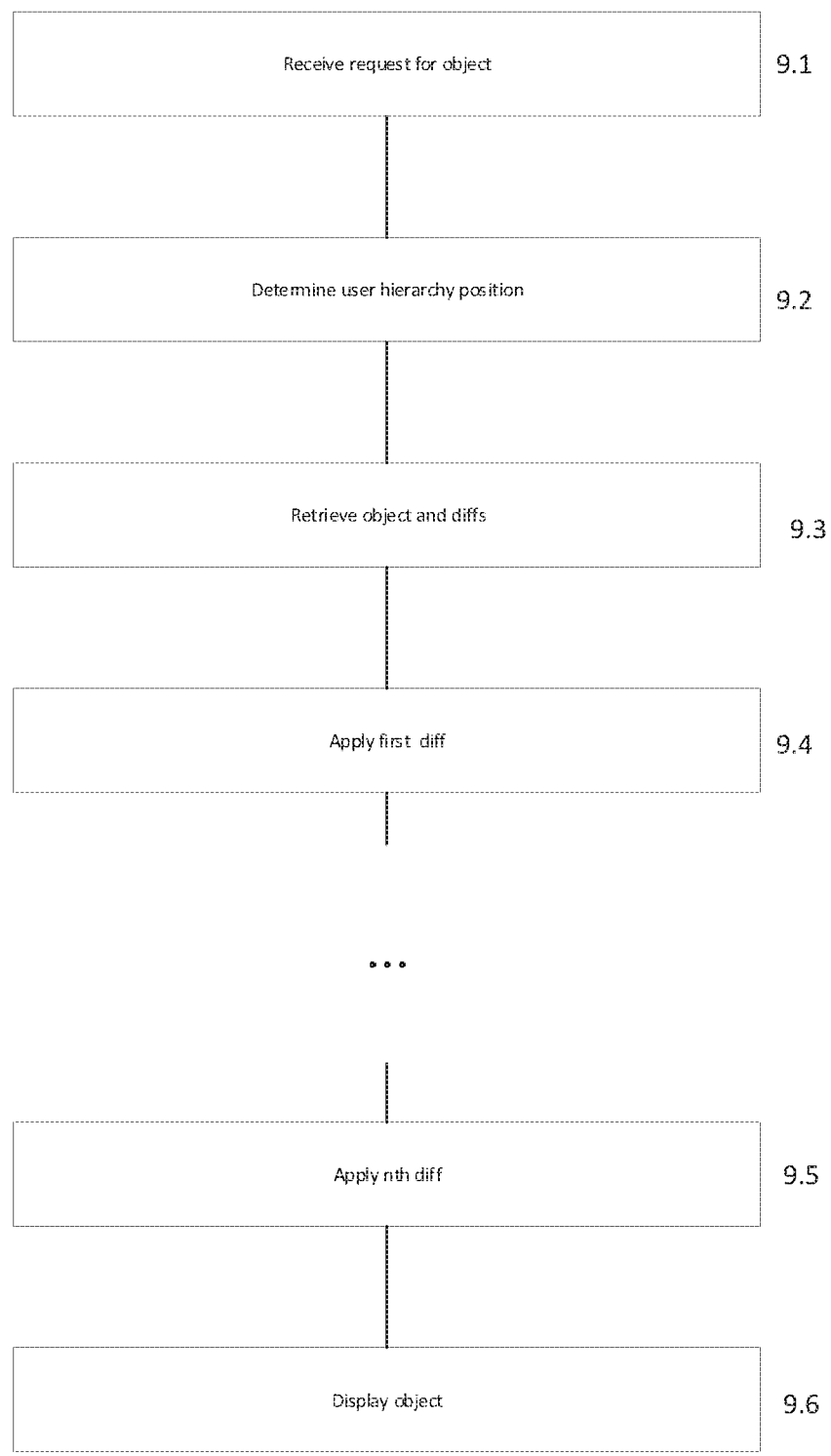
FIG. 9 shows an example of a flow diagram of a method for applying hierarchical user customisations.

An example of a method for applying diffs in a hierarchical manner is shown in FIG. 9. A user in a hierarchy inputs a request for an object through a user interface (operation 9.1). The user request may, for example, be input through a user interface as described in FIGS. 4-6.

In response to the user object request, the system determines user position in the hierarchy (operation 9.2). For example, the system may determine which organisation, teams and/or sub teams the user belongs to.

The requested object is retrieved, along with the diffs associated with the user position in the hierarchy (operation 9.3). The default view of the requested object will be determined by the ontology associated with the object. The diffs provide a series of changes to the default object view.

The first diff in the hierarchy is applied to the default object view at operation 9.4. The first diff may, for example, correspond to the organisation that the user belongs to. For example, the first diff may provide organisational level data or branding to an object view.

One or more further diffs are then applied sequentially to the object view (operation 9.5). Each diff may correspond to a different level in the hierarchy that the user belongs to.

Once the lowest level diff in the hierarchy has been applied, the generated objected is then displayed via the user interface (operation 9.6).

In this way, changes to object views determined at higher levels in the hierarchy can be cascade down the hierarchy to object views at lower levels.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated
features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

The invention claimed is:

1. A method, performed by one or more processors, of querying data in a data repository comprising:
   receiving a search request relating to one or more datasets in the data repository, the search request comprising a display request to display at least a portion of the one or more datasets, the one or more datasets representing objects;
   in response to the search request, generating a searchable database from the one or more datasets in the data repository based on ontological data comprising a type of display to present the one or more datasets and an order in which each of the objects is rendered;
   generating, from the searchable database, an object view of at least the portion of the one or more datasets, the view being generated based on the ontological data;
   determining that the ontological data and a property of one of the objects have been updated;
   identifying one or more portions of the searchable database corresponding to the updated ontological data and the updated property;
   resynchronizing to update the one or more portions, without updating unchanged portions of the searchable database;
   detecting, from a device, a customized change in the object view;
   determining whether the customized change is compatible with the updated ontological data and the updated property;
   in response to determining the customized change is compatible with the updated property and the updated ontological data, presenting the object view including the customized change in accordance with the updated property and the updated ontological data; and
   in response to determining the customized change is incompatible with the updated property and the updated ontological data, presenting an unchanged object view in accordance with the updated property and the updated ontological data.

2. The method of claim 1, wherein the one or more datasets comprises a plurality of datasets and wherein the ontological data comprises an indication of one or more joins between the datasets in the plurality of datasets.

3. The method of claim 1, wherein one or more of the datasets comprises one or more objects and wherein the ontological data comprises display data relating to the one or more objects.

4. The method of claim 3, wherein the ontological data comprises a display prominence for one or more of the objects.

5. The method of claim 1, wherein the search request comprises one or more filters.

6. The method of claim 1, wherein the view comprises one or more lists, the lists comprising tabs linking displayed data to joined datasets.

7. The method of claim 1, wherein the method further comprises editing, through a user interface, the object view to create an edited object view.

8. The method of claim 7, further comprising:
   determining one or more differences between the edited object view and the object view generated in dependence on the ontological data;
   associating the one or more differences with a user; and
   storing the one or more differences in a memory.

9. The method of claim 1, wherein generating the object view comprises:
   retrieving one or more stored object view differences associated with the user;
   determining whether the one or more stored object view differences is compatible with the ontological data associated with the one or more datasets; and
   in response to a positive determination, applying the one or more object view differences to a default object view generated in dependence on the ontological data, thereby to generate the object view.

10. The method of claim 9, wherein generating the object view further comprises:
    in response to a negative determination, generating the default object view for display.

11. The method of claim 9, wherein the one or more stored object view differences comprises a hierarchy of stored object view differences.

12. The method of claim 1, wherein the ontological data is at least in part generated by the one or more processors based on properties of the one or more datasets.

13. The method of claim 1, further comprising:
    editing one or more of the datasets;
    updating the ontological data in dependence on the one or more edited datasets; and
    regenerating the object view in dependence on the updated ontology.

14. The method of claim 1, further comprising:
    editing the ontological data; and
    regenerating the object view in dependence on the edited ontological data.

15. A system comprising:
    a user interface;
    a data aggregation module;
    a data repository comprising a plurality of datasets representing objects; and
    an ontology layer comprising metadata indicative of relationships between the plurality of datasets;
    one or more physical processors;
    a memory storing instructions that, when executed by the one or more physical processors, cause the system to perform:

receiving a search request relating to one or more datasets in the data repository, the search request comprising a display request to display at least a portion of the one or more datasets;

in response to the search request, generating a searchable database from the one or more datasets in the data repository based on ontological data comprising a type of display to present associated with the one or more datasets and an order in which each of the objects is rendered;

generating, from the searchable database, an object view of at least the portion of the one or more datasets, the view being generated based on the ontological data;

determining that the ontological data and a property of one of the objects have been updated;

identifying one or more portions of the searchable database corresponding to the updated ontological data and the updated property;

resynchronizing to update the one or more portions, without updating unchanged portions of the searchable database;

detecting, from the user interface, a customized change in the object view;

determining whether the customized change is compatible with the updated property, the updated type of display, and the updated order;

in response to determining the customized change is compatible with the updated property and the updated ontological data, presenting the object view including the customized change in accordance with the updated property and the updated ontological data; and in response to determining the customized change is incompatible with the updated property and the updated ontological data, presenting an unchanged object view in accordance with the updated property and the updated ontological data.

16. The system of claim 15, wherein the one or more datasets comprises a plurality of datasets and wherein the ontological data comprises an indication of one or more joins between the datasets in the plurality of datasets.

17. The system of claim 15, wherein one or more of the datasets comprises one or more objects and wherein the ontological data comprises display data relating to the one or more objects.

18. A non-transitory computer-readable storage medium including instructions that, when executed by at least one processor of a computing system, cause the computing system to perform a method comprising:

receiving a search request relating to one or more datasets in the data repository, the search request comprising a display request to display at least a portion of the one or more datasets, the one or more datasets representing objects;

in response to the search request, generating a searchable database from the one or more datasets in the data repository based on ontological data comprising a type of display to present associated with the one or more datasets and an order in which each of the objects is rendered;

generating, from the searchable database, an object view of at least the portion of the one or more datasets, the view being generated based on the ontological data;

determining that the ontological data and a property of one of the objects have been updated;

identifying one or more portions of the searchable database corresponding to the updated ontological data and the updated property;

resynchronizing to update the one or more portions, without updating unchanged portions of the searchable database;

detecting, from a device, a customized change in the object view;

determining whether the customized change is compatible with the updated ontological data and the updated property;

in response to determining the customized change is compatible with the updated property and the updated ontological data, presenting the object view including the customized change in accordance with the updated property and the updated ontological data; and in response to determining the customized change is incompatible with the updated property and the updated ontological data, presenting an unchanged object view in accordance with the updated property and the updated ontological data.

19. The non-transitory computer-readable storage medium of claim 18, wherein the one or more datasets comprises a plurality of datasets and wherein the ontological data comprises an indication of one or more joins between the datasets in the plurality of datasets.

20. The non-transitory computer-readable storage medium of claim 18, wherein one or more of the datasets comprises one or more objects and wherein the ontological data comprises display data relating to the one or more objects.

* * * * *